US009407100B2

(12) United States Patent
Joynes et al.

(10) Patent No.: US 9,407,100 B2
(45) Date of Patent: Aug. 2, 2016

(54) MOBILE DEVICE CONTROLLER

(71) Applicant: Wikipad, Inc., Los Angeles, CA (US)

(72) Inventors: Matthew R. Joynes, Agoura Hills, CA (US); H. Britton Sanderford, Metairie, LA (US); James Bower, Windermere, FL (US)

(73) Assignee: Wikipad, Inc., Simi Valley, CA (US)

( * ) Notice: Subject to any disclaimer, the term of this patent is extended or adjusted under 35 U.S.C. 154(b) by 776 days.

(21) Appl. No.: 13/666,532

(22) Filed: Nov. 1, 2012

(65) Prior Publication Data

US 2013/0154542 A1 Jun. 20, 2013

Related U.S. Application Data

(63) Continuation-in-part of application No. 13/363,021, filed on Jan. 31, 2012, now Pat. No. 9,005,025.

(60) Provisional application No. 61/577,709, filed on Dec. 20, 2011.

(51) Int. Cl.
*A63F 13/06* (2006.01)
*H02J 7/00* (2006.01)
*A63F 13/98* (2014.01)
*A63F 13/20* (2014.01)
*A63F 13/92* (2014.01)

(52) U.S. Cl.
CPC .............. *H02J 7/0042* (2013.01); *A63F 13/02* (2013.01); *A63F 13/06* (2013.01); *A63F 13/92* (2014.09); *A63F 13/98* (2014.09); *H02J 7/0052* (2013.01)

(58) Field of Classification Search
CPC ..... A63F 13/02; A63F 13/08; A63F 2300/10; A63F 2300/1025; A63F 2300/1031; A63F 2300/1043; A63F 2300/1062; A63F 2300/204; A63F 2009/2402; A63F 2009/2407; A63F 13/06; A63F 13/92; A63F 13/98; H02J 7/0042; H02J 7/0052
USPC .................................................. 463/36–38, 47
See application file for complete search history.

(56) References Cited

U.S. PATENT DOCUMENTS 2,570,654 A * 10/1951 Dodin .............................. 352/63
5,967,898 A    10/1999 Takasaka et al.
5,976,018 A    11/1999 Druckman (Continued)

FOREIGN PATENT DOCUMENTS

EP     1 274 223        1/2003
EP     1 274 223 A1 *   1/2003 ............ H04M 19/08

OTHER PUBLICATIONS

Atari Arcade; Website Printout; http://atari.com/buy-games/arcade/atari-arcade-ipad; Nov. 30, 2011; pp. 1-3.

(Continued)

*Primary Examiner* — David L Lewis
*Assistant Examiner* — Matthew D. Hoel
(74) *Attorney, Agent, or Firm* — Hall Estill Attorneys at Law; Daniel P. Dooley

(57) ABSTRACT

An apparatus can have a casing that provides a first rigid interface that is configured to engage a second rigid interface of a mobile electronics device to form a direct electrical connection via rigid attachment. The casing may further have a charge controller connected to a circuitry board and configured to distribute charge power from at least a solar panel and external power input to a rechargeable battery.

20 Claims, 7 Drawing Sheets

(56) References Cited

U.S. PATENT DOCUMENTS

| | | | |
|---|---|---|---|
| 6,157,958 A * | 12/2000 | Armitage | G06F 1/1626 709/250 |
| 6,290,565 B1 | 9/2001 | Galyean, III et al. | |
| 6,530,838 B2 * | 3/2003 | Ha | A63F 13/06 345/169 |
| 6,738,049 B2 * | 5/2004 | Kiser et al. | 345/173 |
| 7,199,783 B2 * | 4/2007 | Wenstrand et al. | 345/156 |
| 7,200,702 B2 | 4/2007 | Keely et al. | |
| 7,298,613 B2 | 11/2007 | Yin et al. | |
| 7,580,728 B2 * | 8/2009 | Vance et al. | 455/556.1 |
| 7,653,771 B2 | 1/2010 | Liberty | |
| 7,746,629 B2 | 6/2010 | Assouad et al. | |
| 7,758,424 B2 | 7/2010 | Riggs et al. | |
| 7,774,155 B2 | 8/2010 | Sato et al. | |
| 7,888,908 B2 | 2/2011 | Kuo | |
| 7,933,118 B2 | 4/2011 | Chiu et al. | |
| 8,018,098 B2 | 9/2011 | Lu et al. | |
| 8,100,769 B2 | 1/2012 | Rabin | |
| 8,129,938 B2 | 3/2012 | Lu et al. | |
| 8,188,977 B2 | 5/2012 | Kuwaki et al. | |
| 8,192,285 B2 | 6/2012 | Cheng et al. | |
| 2003/0147008 A1 | 8/2003 | Liu | |
| 2003/0231189 A1 | 12/2003 | Williams | |
| 2004/0140962 A1 * | 7/2004 | Wang et al. | 345/179 |
| 2005/0269769 A1 * | 12/2005 | Naghi | A63F 13/06 273/148 B |
| 2005/0272471 A1 | 12/2005 | Sherman | |
| 2006/0061963 A1 * | 3/2006 | Schrum | 361/686 |
| 2006/0286943 A1 * | 12/2006 | Vance et al. | 455/90.1 |
| 2007/0268247 A1 | 11/2007 | Quatro | |
| 2010/0037072 A1 * | 2/2010 | Nejah | 713/310 |
| 2010/0202627 A1 * | 8/2010 | Gray | H01M 10/465 381/77 |
| 2010/0244765 A1 * | 9/2010 | Collopy et al. | 320/103 |
| 2011/0090626 A1 * | 4/2011 | Hoellwarth et al. | 361/679.01 |
| 2011/0118022 A1 | 5/2011 | Aronzon et al. | |
| 2011/0248665 A1 | 10/2011 | Smith et al. | |
| 2011/0260969 A1 | 10/2011 | Workman | |
| 2012/0108335 A1 | 5/2012 | Liotta et al. | |
| 2012/0169597 A1 | 7/2012 | Liotta | |

OTHER PUBLICATIONS

Ion iCade Arcade Cabinet; Website Printout; http://www.ionaudio.com/products/details/icade; 2012; pp. 1-6.

* cited by examiner

US 9,407,100 B2

MOBILE DEVICE CONTROLLER

RELATED APPLICATIONS

This application is a continuation-in-part of U.S. patent application Ser. No. 13/363,021 filed on Jan. 31, 2012, which in turn claims priority to U.S. Provisional Patent application Serial No. 61/577,709 filed on Dec. 20, 2011.

SUMMARY

Various embodiments of the present disclosure are generally directed to a device controller capable of engaging a mobile device.

In accordance with various embodiments, an apparatus can have a casing that provides a first rigid interface that is configured to engage a second rigid interface of a mobile electronics device to form a direct electrical connection via rigid attachment. The casing may further have a charge controller connected to a circuitry board and configured to distribute charge power from at least a solar panel and external power input to a re-chargeable battery.

DETAILED DESCRIPTION

Figure 1:
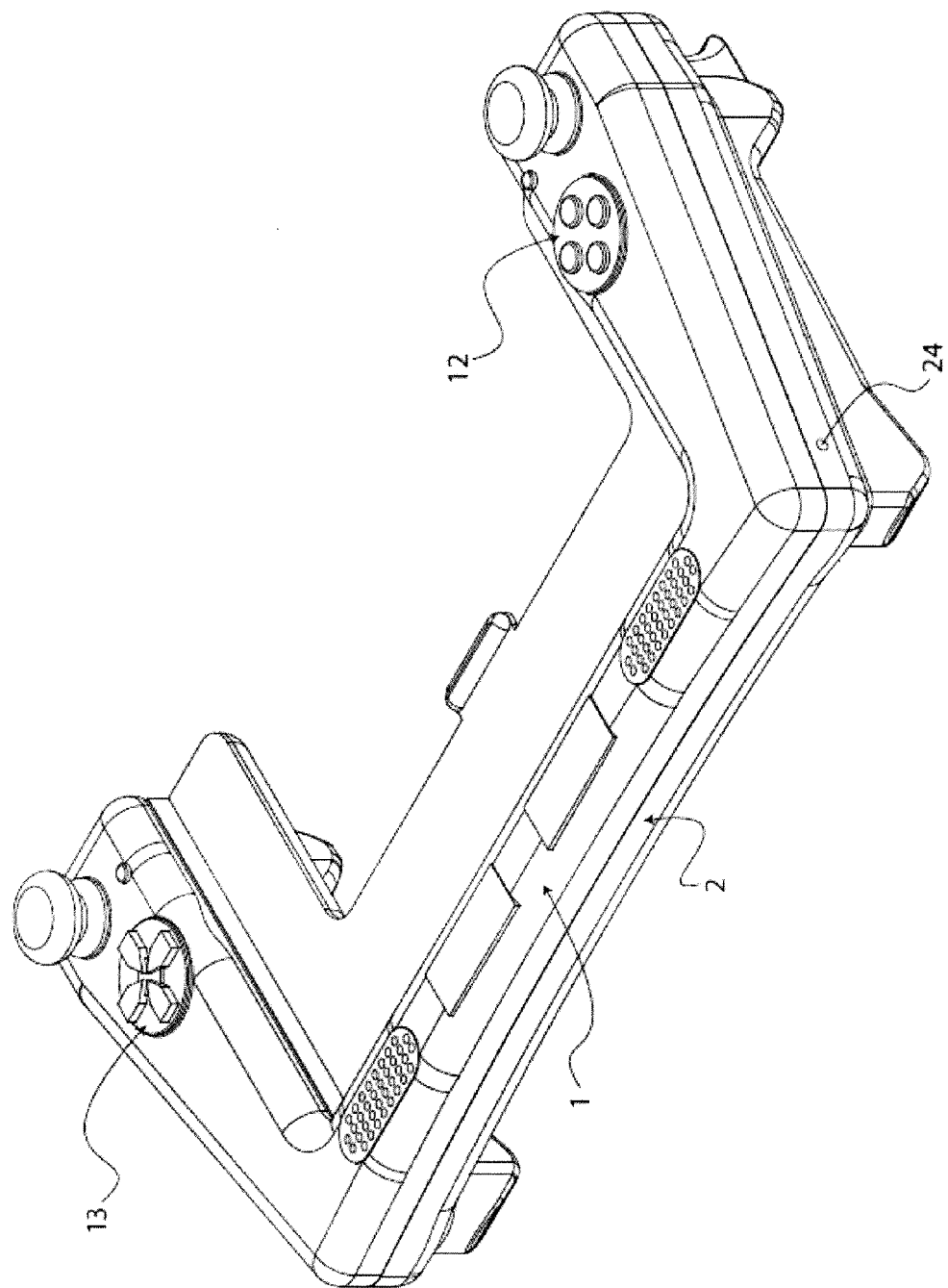
FIG. 1 is a perspective view of an example mobile device controller in accordance with various embodiments.

All illustrations of the drawings are for the purpose of describing selected versions of the claimed technology and are not intended to limit the scope of the present disclosure in any way.

In accordance with various embodiments, a mobile device controller comprises a top casing 1, a bottom casing 2, a circuitry board 3, and one or more rechargeable batteries 4. The circuitry board 3 and each rechargeable battery 4 can be positioned internal or external to the bottom casing 2. The top casing 1 may be connected to and aligned with the periphery of the bottom casing 2.

Operation of the mobile device controller can be conducted with the rechargeable battery 4 as the primary power source with an external power source, such as a rigidly connected mobile device, as a secondary power source. Each rechargeable battery 4 may be electronically connected to one or more circuitry boards 3 to provide power for some, or all, of the operation of the circuitry boards 3. Some embodiments charge each rechargeable battery 4 with an external power cord which is connected between a power outlet and a power input portion of the top 1 and/or bottom 2 casing.

The top casing 1 may be designed as a shell and has an elongated "U" shape design capable of concurrently contacting orthogonal sides of a mobile device, such as a cellular phone, game console, and tablet computer. The top casing 1 has a left vertical section, a right vertical section, and a horizontal section each shaped into predetermined angular relationships. That is, the left and right vertical sections may respectively have a right angle relationship with the horizontal section in some embodiments while other embodiments shape the left or right vertical sections in different angular relationships with the horizontal section.

The top casing 1 can be made out of high strength plastic so the weight of the top casing 1 can be minimized. The color of the top casing 1 can be either white or black but not limited to white or black. The top casing 1 may comprise one or more menu buttons 11, one or more control buttons 12, at least one directional pad 13, at least two joysticks 14, at least two speakers 15, and a plurality of solar panels 16. The top 1 and bottom 2 casings may also be configured to attach to a mobile device by partially surrounding the periphery of the mobile device with a continuous groove defined by the top 1 and bottom 2 casings.

Various embodiments configure the menu buttons 11 with a select button 111 and a start button 112 where the select button 111 is positioned on the left vertical section of the top casing 1 and the start button 112 is positioned on right vertical section of the top casing 1. The menu buttons 11 can be configured in predetermined orientation with respect to either the first 141 or second 142 joystick. Both select button 111 and the start button 112 are shown having a circular shape design, but such configuration is not required or limiting as various other shapes may be utilized as desired.

The select button 111 can be constructed with the word "SELECT" displayed and similarly the start button 112 having the word "START" displayed. The plurality of menu buttons 11 may be electronically connected to at least one circuitry board 3 to allow activation, deactivation, articulation, and selection of various functions. For an example, software applications and certain features within the application can be selected and activated from the select button 111 while the start button 112 can be designated for activating and deactivating any kind of application. As an example, a software game application may be started and stopped by physically depressing the start button 112. The plurality of menu buttons 11 may be made of any material that is capable of withstanding the constant movements of the plurality of menu buttons 11, such as high strength plastic and metal.

The various control buttons 12 are positioned, in accordance with some embodiments, below the start button 112 and physically connected to the right vertical section of the top casing 1. The plurality of control buttons 12 shown in the embodiment of FIG. 2 comprises a left button 121, a bottom button 122, a right button 123, and a top button 124. The plurality of control buttons 12 are positioned ninety degrees apart from each other and have a circular shape design that allows efficient dexterity for a user. The various buttons 121, 122, 123, and 124 can be assigned with any operation and constructed in a variety of different colors and textures. An example, displays the letter "X" on a blue left button 121, the bottom button 122 displays the letter "A" on a green bottom button 122, the red right button 123 displays the letter "B," and the yellow top button 124 displays the letter "Y."

The plurality of control buttons 12 is designed with the above symbolic letters and colors for straightforward directional purposes and aesthetically pleasing looks respectively, which can be designed and constructed in a variety of non-limiting manners. In various embodiments, the plurality of control buttons 12 can be identify as the letters "A" or "Y" to provide less complication and easy operation. The plurality of control buttons 12 may be electronically connected to one or more circuitry boards 3 that provide control of a number of different functionalities within a given application. For example, a fighting game application have many different features like upper kick, lower kick, upper punch, and lower punch that are respectively assigned to predetermined buttons 141, 142, 143, and 144. The plurality of control buttons 12 can be made out of any type of materials, like high strength plastic or metal, which may be capable of withstanding constant and sporadic movements of the plurality of control buttons 12.

The directional pad 13 is shown positioned below the select button 111 and physically connected to the left vertical section of the top casing 1, opposite the start button 112 and right vertical section. The directional pad 13 may be configured with various operational functions, art, and textures such as arrows and dots that correspond to right 131, up 132, left 133, and right 134 arrow buttons. One or more of the buttons may be shaped as an arrow, rectangle, and triangle or combination thereof. A functionality of the directional pad 13 can be to articulate an object by moving up and down or left and right. For an example, if there is a list of input commands, the bottom arrow button 134 can be used to move downward within the list. The directional pad 13 may also perform as the volume controller individually or in conjunction with the select button 111 to increase or decrease speaker volume. The directional pad 13 can be made out of one or more materials, like high strength plastic or metal, which is capable of withstanding constant and sporadic movements of the each button.

Each joystick 141 and 142 is physically positioned on the top casing 1 and have a cylindrical shape design which allows the first joystick 141 and the second joystick 142 to operate independently or concurrently in a rotational and vector manner. The joysticks 141 and 142 are electronically connected to the circuitry board 3 and can be used to provide unique gaming functions, such as continuous 360° circular movement, for game applications that cannot be duplicated by the directional pad 13. Further, one or more joysticks 141 and 142 can provide additional selection functions as depression of the cylindrical component may correspond with activation of a predetermined software command. While not limited, the joysticks 141 and 142 may be made out of high strength plastic or metal to provide durable operation in the face of continual movement.

A mobile device controller, in various embodiments, can be constructed with at least two separate speakers 15 respectively positioned on various portions of the top casing 1 and capable of reproducing and amplifying sound. The sound reproduced from the speakers 15 can originate from the circuitry board 3 or from a connected mobile device, such as a tablet computer or gaming console. Positioning multiple speakers at separate positions on the top casing 1 can allow the ability to reproduce stereophonic, monophonic, and surround sound to enhance mobile device usage.

Figure 2:
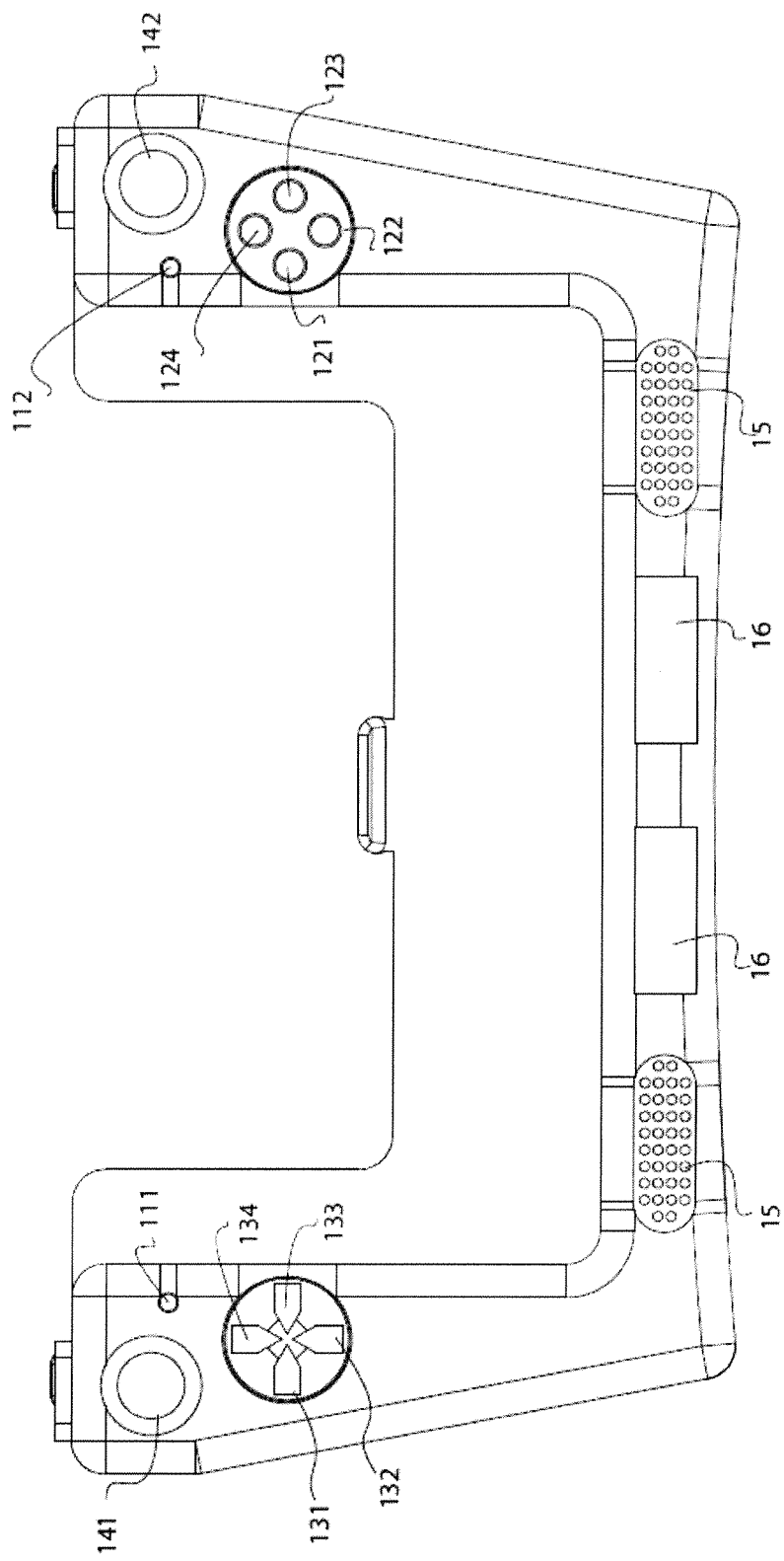
FIG. 2 displays a top view of an example mobile device controller in accordance with some embodiments.

The plurality of separate solar panels 16 are respectively positioned between the at least two speakers 15 and physically connected to the horizontal section of the top casing 1 in the embodiment shown in FIG. 2. However, one or more of the solar panels 16 may be positioned on the bottom casing 2 and on the left or right vertical sections. Each solar panel 16 can be electronically connected to one or more rechargeable batteries 4 either directly or through a charging controller. With the connection of the charging controller between the solar panels 16, external power input, such as a wall outlet or the connected mobile device, and the batteries 4, charging power can consistently be applied to the batteries 4 in accordance with predetermined power schemes.

For example, the charging controller can identify the presence of charging power coming from one or more solar panels 16 and discontinue external power charging of the batteries 4 while directing battery charging from the solar panels. Conversely, the charging controller may be capable of regulating charging power concurrently from the external power source and the solar panels 16 in certain instances, such as if the batteries 4 are very low or the solar panels 16 are not providing consistent power supply.

The charging controller can further be configured to supply a predetermined amount of power to the mobile device controller via a composite of power supplied from the batteries 4 and external power supply. As such, the charging controller can dictate the function of the solar panels 16 and external power source as secondary or primary power sources to constantly recharge the rechargeable batteries 4 as the power level decreases, regardless of external conditions.

Figure 3:
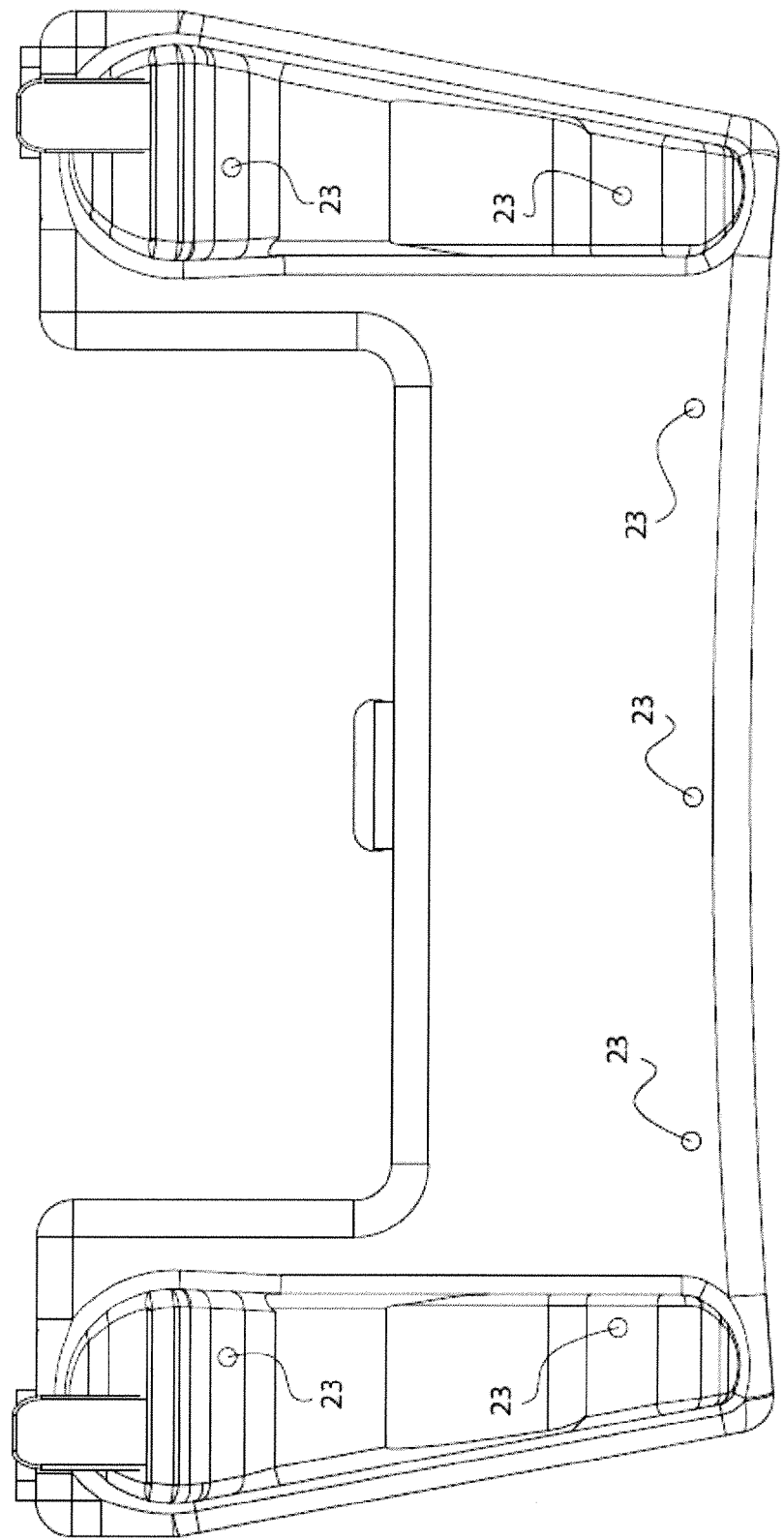
FIG. 3 provides a bottom view of an example mobile device controller constructed and operated in accordance with various embodiments.

Turning to FIG. 3, the bottom casing 2 is shown, as designed in accordance with various embodiments, to be a shell with an elongated "U" shape similar to the top casing 1. The bottom casing 2 has a left vertical segment, a right vertical segment, and a horizontal segment. The left vertical segment and the right vertical segment have a unique design which fits firmly to the user's palms. Such unique design provides secure connection between a user and the casings 1 and 2, which allows for efficient and comfortable handling and engagement of the various joysticks, buttons, and pads. It should be noted that the unique design of the bottom casing 2 can be characterized as rounded protrusions shaped to fit the palm of a user's hand to position the fingers of a user in efficient position to engage the various controls of the mobile device controller.

The bottom casing 2 may be made out of any kind of material that may be similar or dissimilar from the material of the top casing 1, but is a high strength plastic in some embodiments to minimize the weight of the bottom casing 2. Comfort and dexterity of a user may be enhanced with the addition of material to predetermined portions of the top 1 and bottom casing 2. For example, increased friction regions, such as rubber inserts and grooves formed in the casing material, may be positioned proximal the various controls to increase dexterity during strenuous gameplay.

The bottom casing 2 may be configured with a stand or means for connecting a stand to allow the controller and attached mobile device to be erect without contact with the user. Such a stand may be connected to the back side of the bottom casing 2 and positioned parallel to the bottom casing 2 to prevent any obstructions from obscuring the display of the mobile device. Various embodiments configure the stand to be housed within the bottom casing 2 and capable of being extended to provide a variety of angular positions for the display of the attached mobile device.

Figure 4:
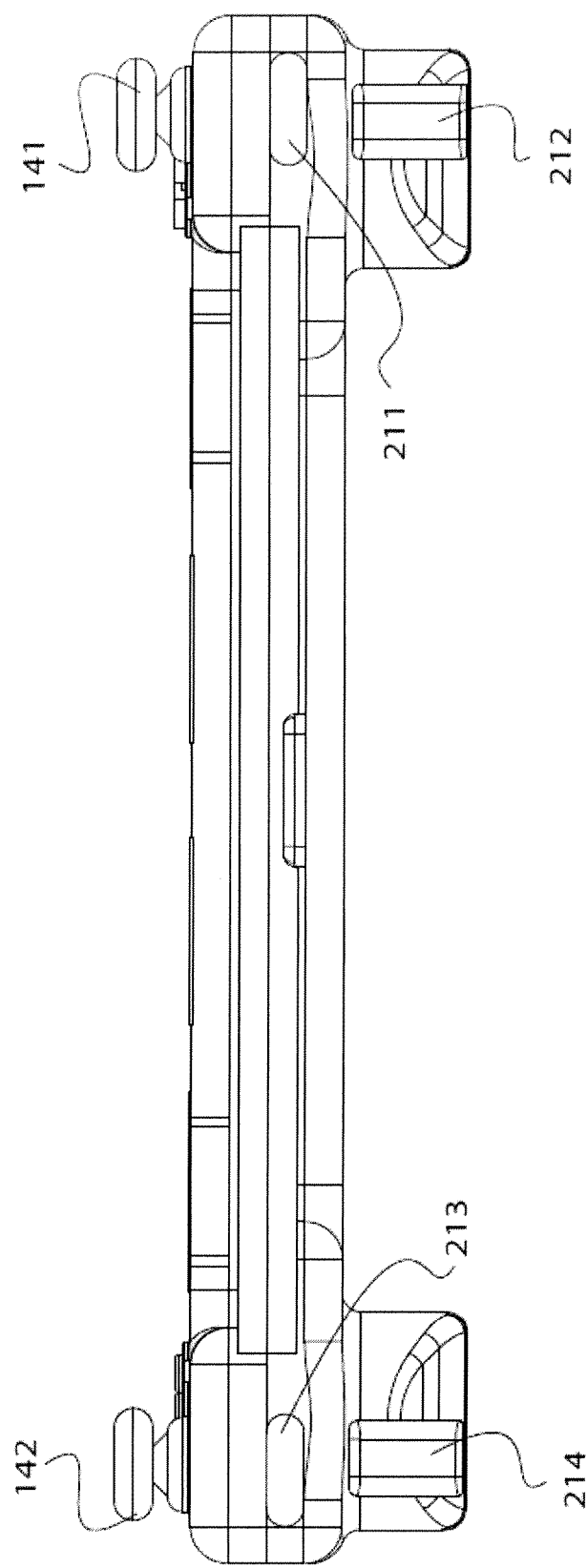
FIG. 4 generally illustrates a front view of an example mobile device controller in accordance with some embodiments.
Figure 5:
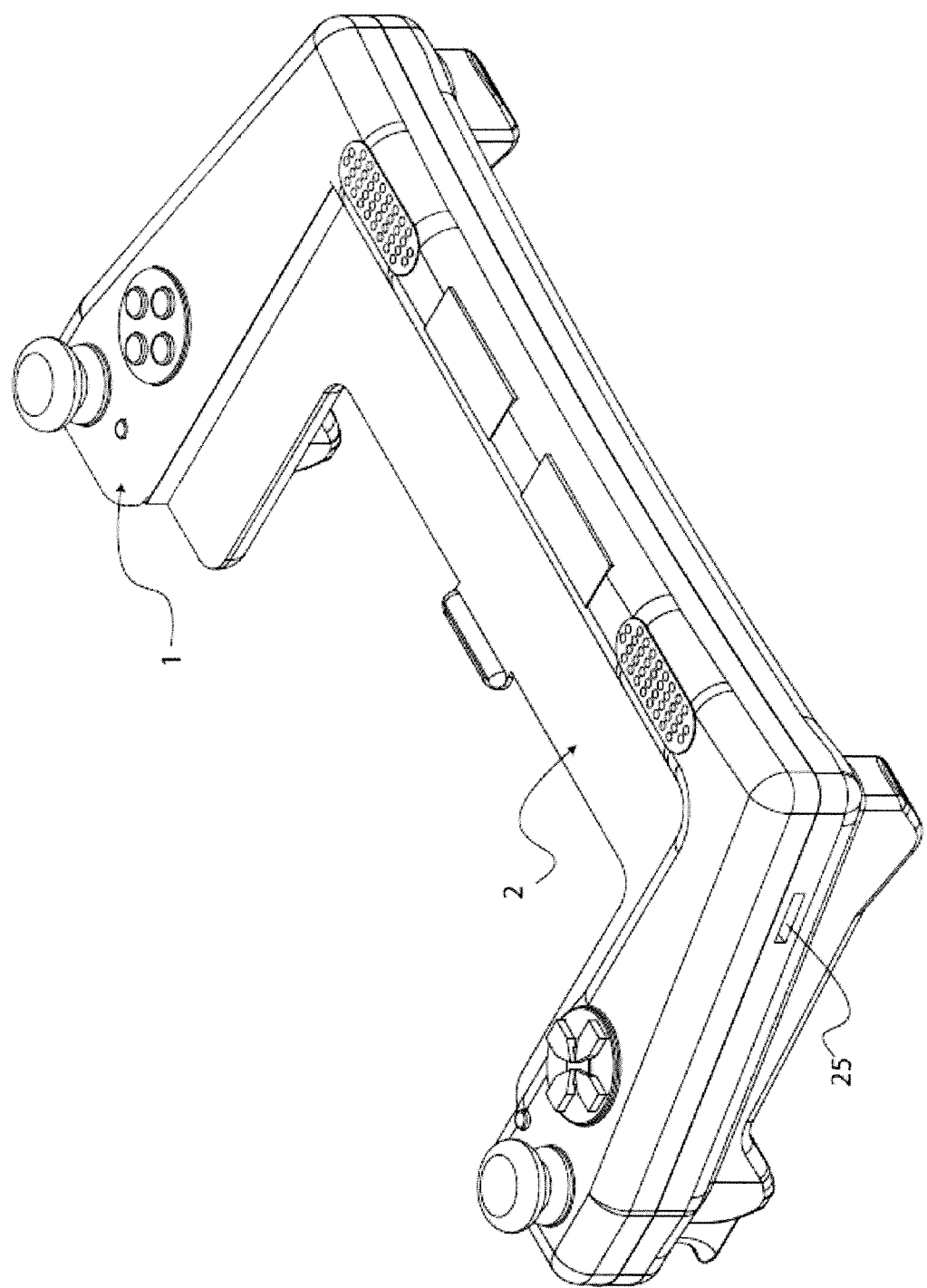
FIG. 5 shows a perspective view of an example mobile device controller constructed and operated in accordance with various embodiments.

FIGS. 3 and 4 respectively show how the bottom casing 2 can provide one or more trigger buttons 21, a plurality of screw holes 23, a headphone jack 24, and a universal serial bus port (USB port) 25. A plurality of trigger buttons 21 can be positioned to be aligned with the right and left vertical portions of the top casing 1 and comprise a top left button 211, a bottom left button 212, a top right button 213, and a bottom right button 214. Both top left buttons 211 and the top right button 213 have a flat top surface, but can be shaped in any manner, such as convex, to provide predetermined engagement with a user's fingers. Each of the trigger buttons 211, 212, 213, and 214 can be made from similar or dissimilar materials, such as high strength plastic, and electronically connected to the circuitry board 3 to perform assigned commands upon activation.

A plurality of screw holes 23 are positioned at predetermined positions in the bottom casing to allow secure physical connection between the top 1 and bottom 2 casing. One or more fasteners, such as rivets and screws, may occupy the screw holes 23 to adhere the casings 1 and 2 for durable longevity. The headphone jack 24 and the universal serial bus port (USB port) 25 are laterally positioned around the bottom casing 2 and can be connect an external device to the circuitry board 3 when the external headphone plug is inserted into the headphone jack 24 or a properly sized serial connector is inserted into the USB port 25.

The USB port 25 may be used to provide power via an external UBS power cord and data storage via an external data storage device. The USB port 25 may be configured to provide two-way communication to and from the attached mobile device. Such voice communication can be adapted to provide voice control of various features of the mobile device and mobile device controller, such as the start button 112 and select button 111.

Figure 6:
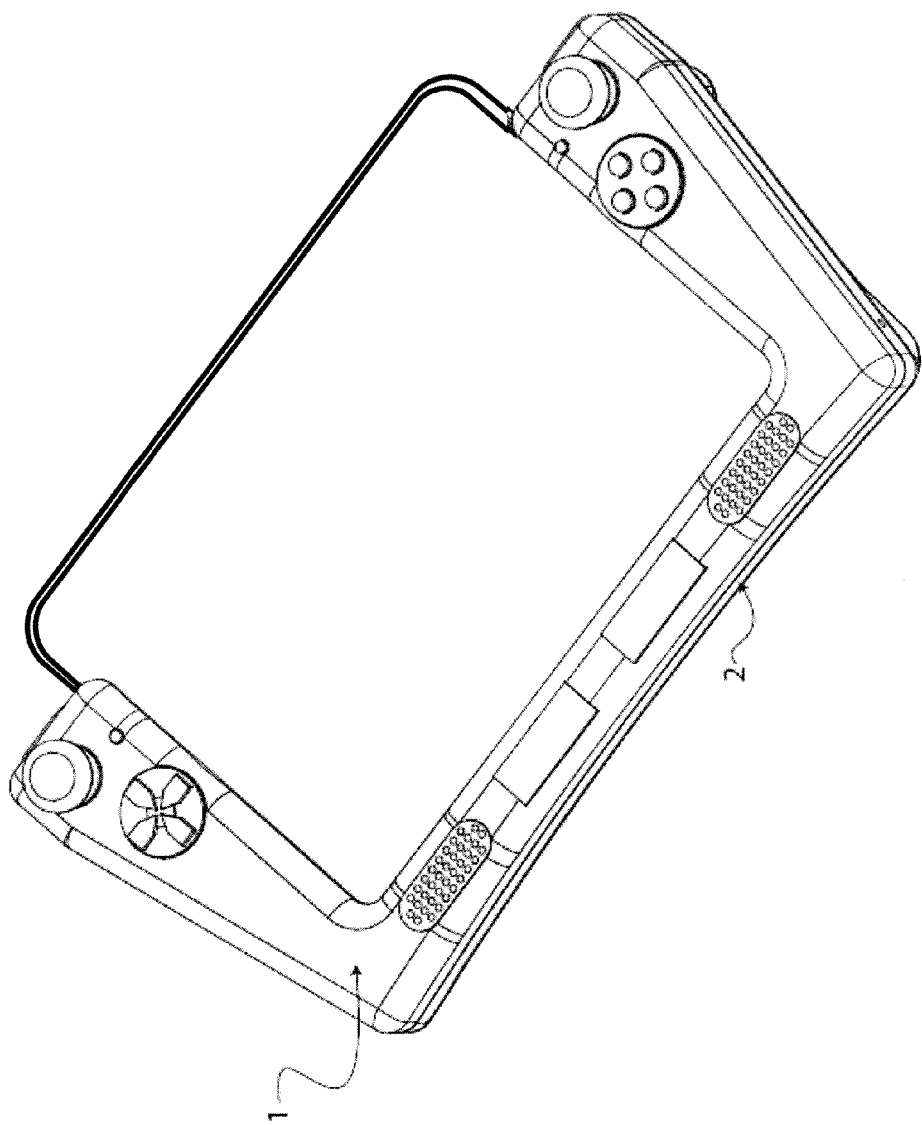
FIG. 6 displays a perspective view of an example mobile device controller operated in accordance with some embodiments.

The mobile device controller may further comprise a control application which can be downloaded into the mobile device whether the mobile device is physically connected to the mobile device controller, or not. That is, the mobile device controller may have software, firmware, and applications stored on an internal data storage component connected to the circuitry board 3 that can be transferred to a mobile device through both a physical connection with an interface, such as a serial connection shown in FIG. 6, or through a wireless connection, such as a Bluetooth connection. Hence, a user has at least two connecting options with mobile devices as the mobile device can be physically attached to the mobile device controller via a rigid electrical connector and through a wireless connection, either individually or concurrently.

The variety of connections may be utilized to provide security features to the mobile device controller. For example, a secure Bluetooth connection or wired serial connection with a verified security key may be mandated before wired or wireless access to an attached mobile device is allowed. That is, security can be required either via wired or wireless means before data or control can be passed from controller to the mobile device. Such security features can allow for confident passage of secure information, such as billing data, personal data, and passwords, from the mobile device controller to the mobile device. Likewise, such security features can effectively lock the mobile device controller from being used by unintended users.

Various embodiments of the mobile device controller configure the distance between the left and right segments of the top casing 1 to conform to the dimensions of a mobile computing device, such as a tablet computer, in a horizontal or vertical orientation. As displayed by the horizontal orientation of a tablet computer in FIG. 6, the mobile device controller can be designed to be viewed at arm's length so that the mobile device display is wider than a predetermined distance between a user's eyes. Such width may necessitate two hands of a user to grip and operate the various controls of the mobile device controller. With the horizontal position of the mobile device, three-dimensional operation of the display of the mobile device can be performed with proper stereoscopic depth of field, with or without three-dimensional glasses being worn by the user.

Figure 7:
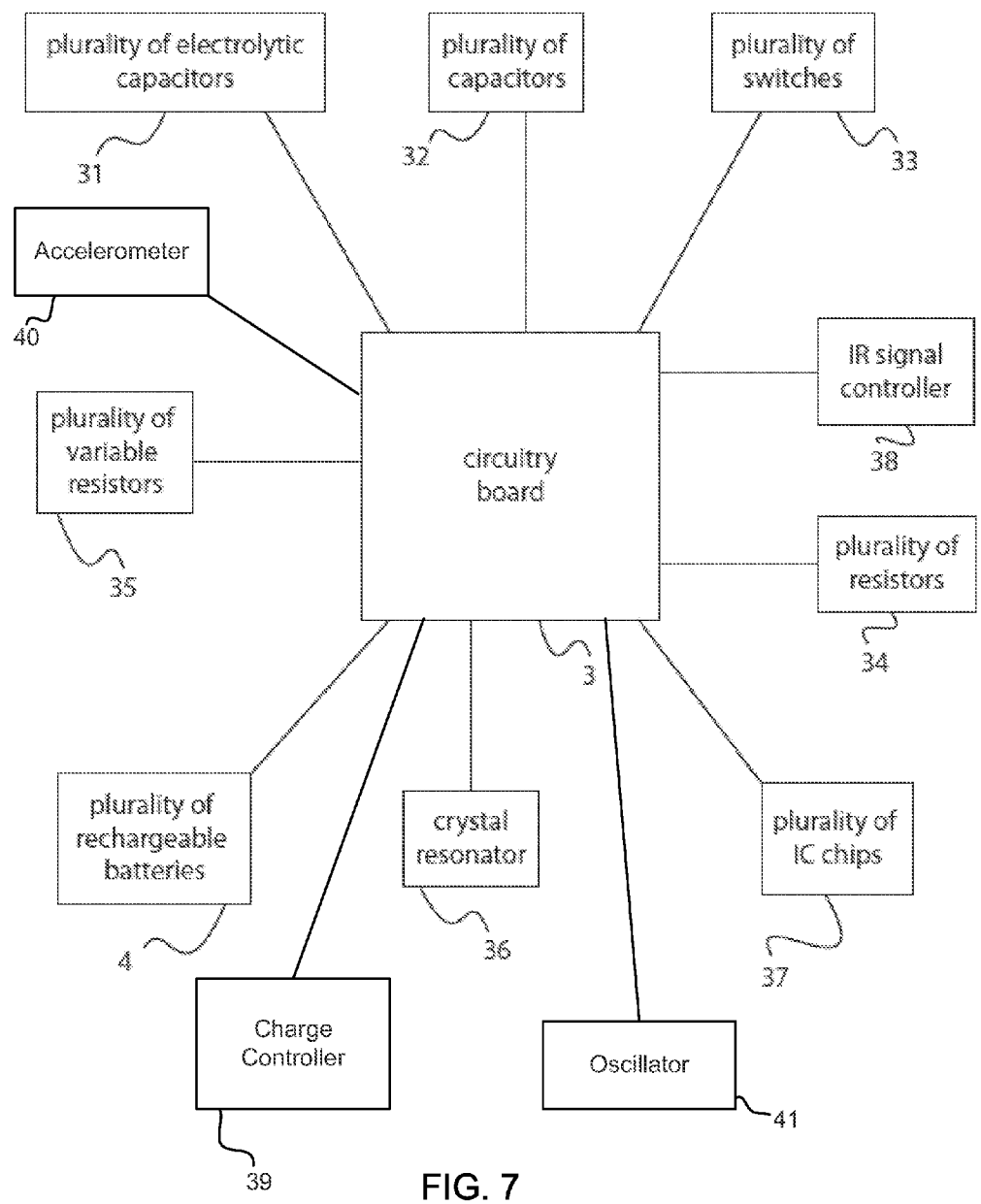
FIG. 7 provides a block representation of an example mobile device controller system in accordance with various embodiments.

FIG. 7 provides a block representation of a portion of an example mobile device controller in accordance with some embodiments. While not limited to any particular capabilities, components, or size, the circuitry board 3 connects all of the input and the output data from the mobile device controller. The circuitry board 3 may comprise at least one electrolytic capacitor 31, capacitor 32, switch 33, resistor 34, variable resistor 35, crystal resonator 36, chip 37, IR signal controller 38, charge controller 39, accelerometer 40, and oscillator 41.

According to some embodiments, one or more accelerometers 40 can be positioned at separate regions of the mobile device controller to accurately sense motion, direction, and acceleration to be used to control digital objects on the attached mobile device. A plurality of accelerometers 40 can be calibrated to correspond to portions of a user's body, such as the user's head, to allow realistic motion of a digital object based on motion of the user's body. Such calibration may further utilize predictive filters with or without external hardware mounted to the user's body, such as a headband, glove, or boot, to define motion of the user in the X, Y, and Z planes, respectively.

One or more electrolytic capacitors 31 can be electronically connected to various other components, like a capacitor 32, resistor 34, and charge controller 39, while the crystal resonator 36 is electronically connected to a plurality of capacitors 32. Similarly, the crystal resonator 36, the resistor 34, and variable resistor 35 may be interconnected with each other and with one or more IC chips IC chips 37 and switches 33. The IR signal controller 38 may be electronically connected to the circuitry board 3 while being connected to at least one infrared eye and radio frequency receiver, which provides an IR signal that can be transmitted from afar to provide wireless control of the mobile device controller and, in turn, the attached mobile device.

The variety of electrical components may provide the circuitry board 3 with a wake up circuit 42 that may or may not include a low power oscillator 41 that allows the circuit to transition from a powered down stage to an activated stage, or vice versa, upon connection, either wired or wireless, to a mobile device. As such, the wake up circuit 42 can conserve power in the batteries 4 by sensing the lack of connection to a mobile device. In some embodiments, the wake up circuit is implemented as part of the charge controller and/or an accelerometer 40 so that battery power and activation of the mobile device controller is seamless with connection and movement of the attached mobile device.

With the various structural and operational configurations of the mobile device controller, sophisticated control, connections, and power management can be combined into an ergonomically designed device. The configuration of the various buttons, joysticks, triggers, and directional pads can allow a user to comfortably engage in virtually any activity provided by an attached mobile device from playing a game to watching a video. Moreover, the numerous power features afforded by the charging controller, solar panels, and rechargeable batteries allows for diverse use of the mobile device controller without inconvenient outlet connections and battery replacement.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
   a circuitry board housed in a casing and configured with a first interface configured to engage a mobile electronics device, the interface forming a direct electrical connection via rigid attachment of the first interface and a second interface of the mobile electronics device, wherein the casing provides not more than a three sided open U-shaped structure with an absence of structure between the vertical portions of the U-shaped structure in which the mobile electronics device nests, such that the mobile electronics device is confined by the open U-shaped three sided structure, and in which the absence of structure between the vertical portions of the U-shaped structure minimizes the weight of the U-shaped structure; and
   a charge controller connected to the circuitry board, the charge controller configured to manage power distribution at least between a power sources of the circuitry board, a power source of the mobile electronics device and external power source.

2. The apparatus of claim 1, further comprising a solar panel secured to and communicating with the mobile electronics device and communicating with the charge controller, the charge controller additionally managing the solar panel as a portion of power distribution, and in which the casing is shaped with left and right segments extending from opposite sides of a central section.

3. The apparatus of claim 1, further comprising a solar panel secured to casing and communicating with the mobile electronics device, the circuitry board and the charge controller, the charge controller additionally managing the solar panel as a portion of power distribution, and in which the casing comprises at least one protrusion configured to ergonomically engage a user's hand.

4. The apparatus of claim 2, in which the casing provides a plurality of buttons, joysticks, speakers, triggers, and solar panels.

5. The apparatus of claim 4, in which the plurality of speakers comprise separate speakers configured to provide stereophonic sound reproduction, and wherein each the power source of the circuitry board, a power source of the mobile electronics device is a battery.

6. The apparatus of claim 2, in which a first trigger and joystick are respectively positioned on the left segment of the casing while a second trigger and joystick are respectively positioned on the right segment of the casing.

7. The apparatus of claim 1, in which the mobile electronics device is a tablet computer.

8. The apparatus of claim 1, in which the casing houses an extendable stand configured to maintain an upright position for the mobile electronics device without contact from a user.

9. A mobile device controller comprising:
   a casing providing a first rigid interface configured to engage a second rigid interface of a mobile electronics device to form a direct electrical connection via rigid attachment, wherein the casing provides not more than a three sided open U-shaped structure with an absence of structure between the vertical portions of the U-shaped structure in which the mobile electronics device nests, such that the mobile electronics device is confined by the open U-shaped three sided structure, and in which the absence of structure between the vertical portions of the U-shaped structure minimizes the weight of the U-shaped structure; and
   a charge controller connected to a circuitry board housed in the casing, the charge controller configured to distribute charge power from at least a solar panel and external power input to a re-chargeable battery.

10. The mobile device controller of claim 9, in which the casing has a width that is greater than twice a predetermined distance between a user's eyes.

11. The mobile device controller of claim 9, in which the mobile electronics device is partially housed in a continuous groove defined by top and bottom portions of the casing.

12. The mobile device controller of claim 11, in which the casing and mobile electronics device are configured to be viewed at arm's length during rigid attachment.

13. The mobile device controller of claim 11, in which two hands of a user are required to control the casing and mobile electronics device.

14. The mobile device controller of claim 11, in which the casing has a width insuring a stereoscopic depth of field for the mobile electronics device.

15. The mobile device controller of claim 11, in which the circuitry board has at least one accelerometer configured to sense movement of predetermined portions of a user's body with predictive filters.

16. The mobile device controller of claim 11, in which the rigid attachment and a wireless connection can concurrently connect the circuitry board to the mobile electronics device.

17. The mobile device controller of claim 16, in which at least one security key is provided to unlock the mobile electronics device and allow secure data access.

18. A device comprising:
   a casing providing a first rigid interface configured to engage a second rigid interface of a mobile electronics device to form a direct electrical connection via rigid attachment, wherein the casing provides not more than a three sided open U-shaped structure with an absence of structure between the vertical portions of the U-shaped structure in which the mobile electronics device nests, such that the mobile electronics device is confined by the open U-shaped three sided structure, and in which the absence of structure between the vertical portions of the U-shaped structure minimizes the weight of the U-shaped structure;
   a charge controller connected to a circuitry board housed in the casing, the charge controller configured to distribute charge power from at least a solar panel and external power input to a re-chargeable battery; and
   a wake up circuit interconnected with the circuitry board and configured to activate and deactivate the circuitry board and mobile electronics device in response to movement of the casing.

19. The device of claim 18, in which the wake up circuit comprises a low power oscillator.

20. The device of claim 18, in which the wake up circuit is configured to sense movement of the casing via at least one accelerometer housed in the casing.

* * * * *